United States Patent [19]

Bender et al.

[11] 4,416,604

[45] Nov. 22, 1983

[54] UNIVERSAL MOLDING SYSTEM AND METHOD

[75] Inventors: Ernest S. Bender, Chardon; Marty C. Ignasiak; Michael H. Jones, both of Cleveland, all of Ohio

[73] Assignee: Associated Enterprises, Inc., Cleveland, Ohio

[21] Appl. No.: 269,425

[22] Filed: Jun. 1, 1981

[51] Int. Cl.³ .............................................. B29E 1/00
[52] U.S. Cl. ............................... 425/183; 425/185; 425/186; 425/190; 425/192 R; 425/556; 425/572; 249/102
[58] Field of Search ............... 425/183, 185, 186, 190, 425/192 R, 556, 572; 249/102-104

[56] References Cited

U.S. PATENT DOCUMENTS

| | | | |
|---|---|---|---|
| 2,571,766 | 10/1951 | Saulino | 18/30 |
| 3,025,570 | 3/1962 | Halward | 18/42 |
| 3,091,809 | 6/1963 | Trueblood | 18/30 |
| 3,103,705 | 9/1963 | Letica | 249/102 X |
| 3,221,366 | 12/1965 | Couchman | 425/186 |
| 3,315,318 | 4/1967 | Halward | 18/43 |
| 3,362,046 | 1/1968 | Blumer | 18/30 |
| 3,399,428 | 9/1968 | Valyi | 18/30 |
| 3,408,689 | 5/1968 | Heiner | 18/2 |
| 3,669,593 | 6/1972 | Cyriax | 425/186 |
| 3,717,428 | 2/1973 | Andras | 425/191 |
| 3,871,611 | 3/1975 | Taketa | 249/102 |
| 3,977,820 | 8/1976 | Beyerlein et al. | 425/247 |
| 4,034,951 | 7/1977 | Sokoloski | 425/186 X |
| 4,050,666 | 9/1977 | Van Tichelt | 249/68 |
| 4,076,477 | 2/1978 | Hacke | 425/192 R |

Primary Examiner—Thomas P. Pavelko
Attorney, Agent, or Firm—Maky, Renner, Otto & Boisselle

[57] ABSTRACT

A universal injection molding system has plural pairs of mold inserts that are engageable for mold cavities mounted on mold bases, respectively, on the relatively movable top clamp plate and base support plate of an injection molding machine. Rails on those bases hold the mold inserts in place in paired alignment. With the plates and bases closed to bring together respective mold insert pairs, the mold inserts are securely clamped in relatively fixed positions on the plates and bases. A multiple stage ejecting/stripping apparatus also is provided to strip parts from mold cavities, and a technique is provided to eject the sprue before the parts. Methods of facilitating set-up of an injection molding system and of injection molding also are disclosed.

41 Claims, 14 Drawing Figures

_FIG. 12_

_FIG. 13_

UNIVERSAL MOLDING SYSTEM AND METHOD

TECHNICAL FIELD

The invention relates generally, as indicated, to injection molding and, more particularly, to a universal injection molding system and method to facilitate injection molding of quality parts from plastic or other injection molding material.

BACKGROUND OF PRIOR ART

In a typical injection molding machine one or more pairs of A and B mold bases (the letters A and B refer to the usually fixed and usually movable bases, respectively) is mounted, respectively, on the top clamp plate and base support plate of the machine. Plural A and B mold inserts usually having mold cavity defining means therein are fixed in the bases in paired alignment, whereby upon closure of the base support plate toward the top clamp plate respective pairs of oppositely disposed mold inserts are brought together to close the mold cavities. Molding material is fed through the top clamp plate and A mold base thereon to a runner distribution system in the two mold bases, and molding material is delivered from such distribution system to respective mold cavities to mold parts. Moreover, an ejector apparatus usualy is provided to eject the molded parts from the opened mold cavities and the sprue from the runner distribution system by means of ejector pins that extend, for example, through the base support plate, B mold base and B mold inserts mounted thereon.

Some disadvantages to such conventional injection molding systems are the lengthy time required for set-up, long down-time required for repair, and minimum versatility. For example, it often takes half a day or more for a skilled worker to mount mold inserts accurately in respective mold bases. Usually, though, there is some initial misalignment which is discernible only after the mold bases are used in the injection molding machine; whereupon the mold bases are removed from the machine for fine adjustment alignment of the mold inserts therein using shims, spacers and other conventional means. Such removal too, is difficult due to the heavy weight of the assembled mold bases and mold inserts.

If a part becomes stuck in a mold cavity or runner distribution system and cannot be removed easily, the entire mold base often is removed from the injection molding machine to remove the stuck part, thus causing substantial down-time of the machine.

To avoid the need to realign mold inserts in a mold base after having been aligned accurately already, the mold inserts often are kept in the mold base for use in subsequent production of injection molded parts. Such retention of assembled mold inserts and bases results in high inventory costs. Also, to replace a defective mold insert with a functional one in an already aligned set-up of mold inserts in a mold base, to add a mold insert to such an already aligned set-up, etc. is time consuming with attendant high labor cost.

BRIEF SUMMARY OF INVENTION

According to the present invention an injection molding system has plural A and B mold inserts in paired alignment to form mold cavities mounted on respective A and B bases that in turn are secured to the relatively movable top clamp plate means and base support plates, a runner distribution system to delivery molding material to respective mold cavities, and a holding means operable with facility to hold securely respective mold inserts on the bases while the latter are secured to top clamp and base support plates. The holding means preferably includes plural rails to hold mold inserts on the respective bases and a clamping apparatus that applies a bidirectional force to the mold inserts holding them securely on the respective bases.

To set up the injection molding system for use, rails are mounted on the bases in locations appropriate to mount the desired mold inserts, and the bases, which also may be referred to herein as top clamp plate means or base support plate means depending on the plate to which the base is intended for attachment, are attached to the top clamp and base support plates, respectively, of the injection molding machine. Mold inserts are slid into position between respective rail pairs. The base support plate is moved toward the top clamp plate to close respective mold cavities defined by opposed pairs of mold inserts. The mold inserts have self-alignment pins and recesses to assure accurate alignment of respective pairs thereof upon such closure. With the plates closed and the mold insert pairs self-aligned, respective clamps of the clamping apparatus are tightened firmly securing the mold inserts in relatively fixed position on respective bases.

If a part sticks in one mold cavity half during use of the injection molding system, the mold inserts which molded that part may be removed and the runner distribution system adjusted to close the molding material delivery path to the then vacant location of the system. Mold inserts may be removed and/or replaced, as desired, with mold inserts for molding the same or different parts of the same or different sizes. Additionally, rails may be added or removed from the mold bases to accommodate mold inserts of different sizes. Attachment of the bases to the plates is facilitated because the bases are relatively light weight since the mold inserts may be added after such attachment. Also, inventory requirements are reduced because mold insert pairs may be stored on shelves, not on mold bases, and may be easily mounted on the bases when desired.

Further to enable facile mounting and removal of mold inserts, the mold base associated with the movable base support plate has a universal ejector system therein and, therefore, may be referred to as the ejector mold base. Such ejector system has plural ejector pins movable in response to movement of a common ejector plate to deliver a part ejecting force when the base support plate is opened or moved away from the top clamp plate. A common return device returns all of the ejector pins to a returned position, as the base support plate is closed toward the top clamp plate. In such returned position, the ends of the ejector pins remote from the common operating plate are coplanar with or recessed with respect to the mounting surface, i.e. on which mold inserts are mounted, of the mold base so as not to interfere with insertion and removal of mold inserts thereon. Those mold inserts, the B ones, mounted on the ejector or B mold base have self-contained stripper bars for stripping parts therefrom. The stripper bars are moved to recessed positions upon closure of respective mold cavities and are moved to strip molded parts from the mold insert when the mold cavities are opened and the ejector pins abut the stripper bars applying an ejecting or stripping force to move them. The ejector system also preferably includes sprue ejector pins for ejecting the sprue from the runner distribution system when the plates are opened; most preferably the sprue is ejected at a different time than the parts are ejected to facilitate separating the sprue and parts.

With the foregoing in mind, then, a primary object of the present invention is to improve techniques for injection molding.

Another object is to facilitate injection molding.

An additional object is to increase versatility of injection molding equipment.

A further object is to minimize down-time of injection molding equipment.

Still another object is to expedite set-up and/or adjustment of injection molding equipment.

Still an additional object is to minimize mold cost for injection molding equipment.

Still a further object is to improve the quality of injection molded parts.

Even another object is to facilitate mechanization of injection molding equipment.

Even an additional object is to maximize utilization of an injection molding machine.

Even a further object is to facilitate mounting molds for injection molding in an injection molding machine.

Yet another object is to facilitate separating parts and sprue in an injection molding process.

Yet a further object is to reduce the cost of injection molding equipment and processes.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF DRAWINGS

In the annexed drawings:

FIG. 3 is a fragmentary side elevation view of a pair of A and B mold inserts mounted in respective A and B mold bases;

DESCRIPTION OF THE PREFERRED EMBODIMENT AND BEST MODE OF THE INVENTION

Figure 1:
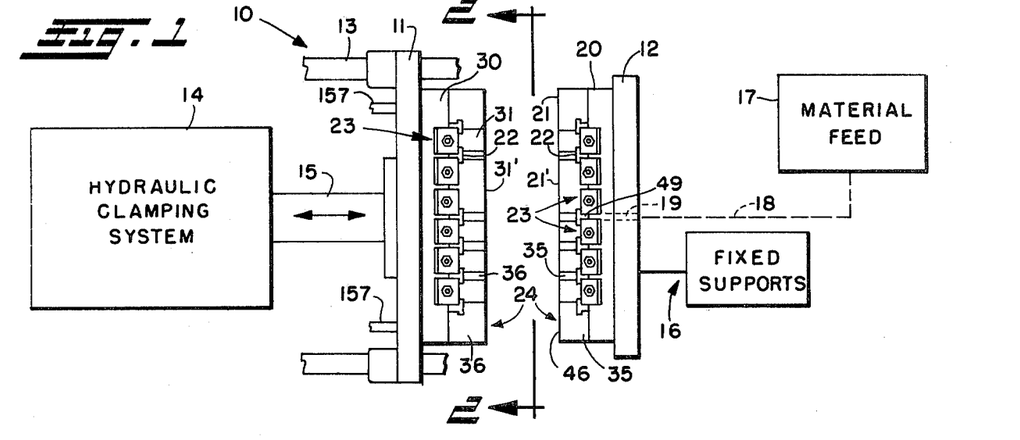
FIG. 1 is an end elevation view schematically illustrating an injection molding machine system in accordance with the present invention.

Referring in detail to the drawings, wherein like reference numerals designate like parts in the several figures, and initially to FIG. 1, an injection molding machine system is generally indicated at 10. The system 10 includes relatively movable conventional base support plate 11 and top clamp plate 12. The base support plate 11 is movable along guide rails 13 toward and away from the top clamp plate 12 in response to driving force exerted by a hydraulic clamping system 14 via a drive rod 15. The top clamp plate 12 is held in fixed position by supports 16, and ordinarily molding material, such as molten plastic material, is delivered from a material feed 17 via a flow path 18 into an inlet passage 19 in the top clamp plate.

Mounted on the top clamp plate 12 by conventional means (not shown) is an A mold base 20. The A mold base in turn has plural A mold inserts 21 securely mounted thereon by T-shape cross section rails 22 and a clamping apparatus 23. In FIG. 1 there are four A mold inserts 21 of the same size and one relatively larger mold insert 21' all mounted on the A mold base 20. Moreover, part of the runner distribution system 24 also is mounted on the A mold base 20.

The B mold base 30 is mounted on the base support plate 11 by conventional means (not shown), and a plurality of B mold inserts 31 in turn are mounted on the B mold base by rails 22 and further clamping apparatus 23. As is seen in FIG. 1, there are four relatively small B mold inserts 31 positioned opposite respective A mold inserts 21 and a single relatively larger B mold insert 31' aligned opposite the large A mold insert 21'.

Portions of a substantially blank runner block 35 and channeled runner block 36, which form the runner distribution system 24, may be seen between respective mold inserts 21, 31. During ordinary use of the system 10 assembled in the manner illustrated in FIG. 1, the base support plate 11 is moved toward the top clamp plate 12 to bring respective aligned pairs of A and B mold inserts 21, 31 into direct at least substantially sealed engagement with each other to form respective mold cavities of precise configuration. Molding material received through the inlet passage 19 is injected then into the respective mold cavities via the runner distribution blocks 35, 36. After the molding material has solidified adequately, the base support plate 11 is withdrawn away from the top clamp plate 12 opening respective mold cavities. As is described below, the molded parts and the sprue, which is the solidified material remaining in the runner distribution system 24, is ejected and the system 10 is ready to repeat such just-described operation.

Figure 2:
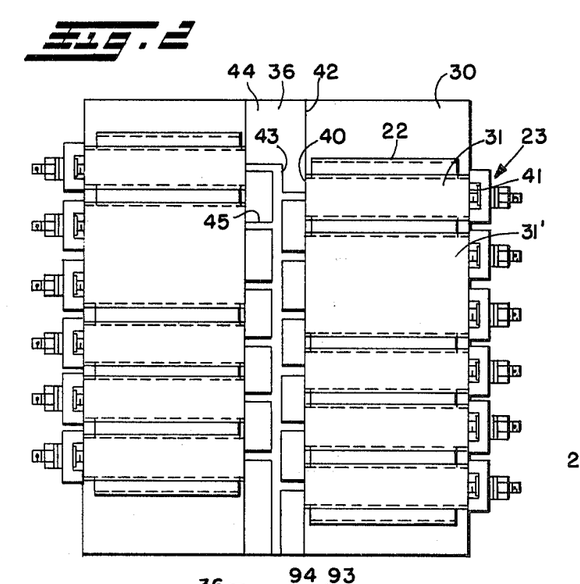
FIG. 2 is a plan view of the B mold base with B mold inserts clamped in place and looking generally in the direction of the arrows 2—2 of FIG. 1.

In FIG. 2 the plan arrangement of schematically illustrated B mold inserts 31 and 31' on the B mold base 30 is shown relative to the channeled runner block 36. The rails 22 extend in parallel relation to each other and in a generally perpendicular direction relative to the major extent of the runner block 36. Moreover, each B mold insert 31 has a pair of substantially flat end faces 40, 41 at opposite ends thereof. The flat end face 40 intimately engages a corresponding flat surface 42 of the runner block 36 under the forceful urging of the clamping apparatus 23. The channeled runner block 36 has a main runner channel 43 in the top surface 44 thereof and a plurality of individual runner channels 45 stemming from the main runner channel to conduct molding material to the mold cavities of respective mold insert pairs. The blank runner block 35, which is not shown in plan detail, is similar in size and plan configuration to the channeled runner block 36. However, the top surface 46 (FIG. 1) of the blank runner block is substantially completely smooth preferably without any channels therein. Such top surface 46 forms with the top surface 45 of the runner block 36 a substantially completely fluid-tight seal to limit flow of molding material only through the respective runner channels 43, 45. The blank runner block 35 also has a flow passage therethrough and in which a sprue bushing 49 (FIG. 14) may pass to conduct molding material from the inlet passage 19 to the main runner channel 43.

On the A/B mold bases 20, 30, the respective runner blocks 35, 36 are generally centrally located along an approximate center line. The runner blocks 35, 36 are attached to the respective mold bases by conventional fasteners and may be removed, if desired, for reconditioning, substitution, etc. Furthermore, the mold inserts, such as the mold inserts 31 seen in FIG. 2, preferably are mounted on the respective mold bases on both sides of the respective runner blocks, thereby maximizing the number of mold inserts that may be mounted on a given mold base and space utilization of the latter.

Turning now to FIGS. 3–7, each rail 22 has a web portion 50 and a head portion 51. The rail 22 are secured to the respective mold bases 20, 30 by cap screws 53. Dowels 54 facilitate locating the rails and securement thereof in respective positions on the mold bases. The mold bases preferably are formed with plural openings that may be selected, depending on the number of rails and their mounted locations, to accommodate respective cap screws 53 and dowels 54. Therefore, several rails may be removed to accommodate between remaining adjacent rails relatively large mold inserts; alternatively by adding rails the space between adjacent rails is decreased to accommodate smaller mold inserts.

Each mold insert is block-like (FIGS. 6 and 7 in particular) having the opposite end faces 40, 41 joined by a bottom connecting surface 55 therebetween. Preferably the bottom surfaces 55 of the mold inserts 21, 31 are flat to slide smoothly along in close engagement with smooth flat main support surfaces 56, 57 of respective mold bases 20, 30. Also, preferably the end faces 40, 41 extend up generally in orthogonal relation to the bottom surfaces 55. Side portions of the rail heads 51 fit in grooves 60 in respective side walls 61 of the mold inserts 21, 31, to hold the mold inserts generally in position on respective mold bases.

Figures 6, 7:
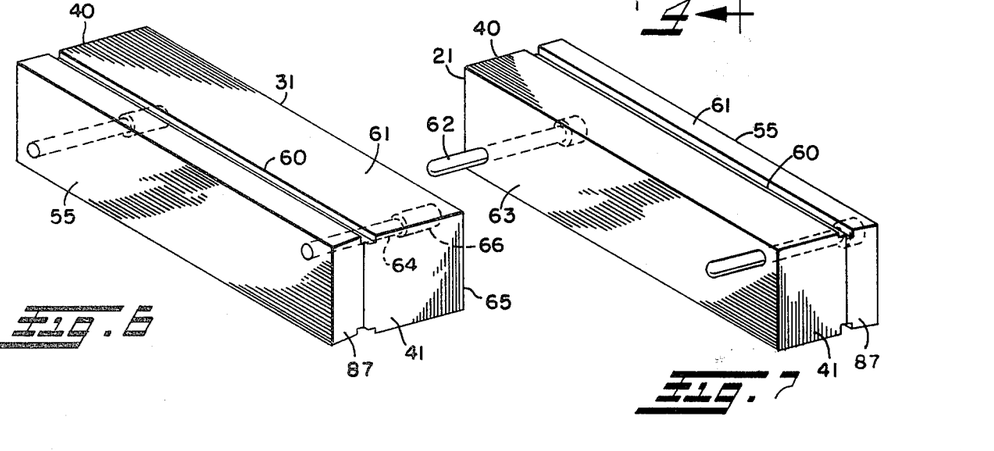
FIGS. 6 and 7 are isometric views of B and A mold inserts, respectively.

The mold inserts 21, 31 have a self-aligning system to align a pair of A/B mold inserts when closed in precise relation to define accurately a prescribed mold cavity. Such self-aligning system is comprised of protruding guide pins 62 at diagonally opposite corners of the A mold insert 21 surface 63 and a pair of mating guide openings 64 in the body of the B mold insert 31. The guide openings 64 actually open at the surface 65 of the mold insert 31 in position ordinarily to receive insertion of respective guide pins 62. Guide bushings 66 in the guide openings 64 help to guide the pins 62 upon such insertion.

In the clamping apparatus 23 a clamping arm 70 of U-shape configuration has a pair of legs 71, 72 extending generally perpendicularly to a slotted connecting body 73. A threaded stud 74, which is fastened to a respective mold base 20, 30, has a securing nut 75 mounted thereon to tighten the clamping arm 70 against a respective mold base and mold insert. Washers 76 separate the nut 75 from the clamping arm 70. A roll pin 77 prevents the nut 75 from inadvertently falling off the threaded stud 74, and the threaded stud is held in position in the mold base by a locking dowel 78 (FIG. 5). The locking dowel must be removed to turn the threaded stud in the threaded passage 79 therefor in the mold base. A spring 80 partly in a recess 81 in the mold base to accommodate the spring applies a resilient force to the clamping arm 70 via a force distributing washer 82 ordinarily biasing the clamping arm against the nut 75. Moreover, guide dowels 83 prevent rotation of respective clamping arms 70 about respective studs 74. A slot 84 in the connecting body 73 of clamping arm 70 permits vertical movement, i.e. relative to the illustrations of FIGS. 3 and 4, of the clamping arm when the nut 75 is loosened.

In cooperation with the clamping apparatus 23 each of the mold bases 20, 30 has a sloped surface 85 at its end face or wall 86, and each mold insert 21, 31 has a sloped surface portion 87 in the end face 41. The sloped surfaces 85, 87 are sloped in a direction relative to the flat major portion of end face 41 so as to cooperate with the clamping legs 71, 72 to apply what may be considered a bidirectional force to the mold insert when the nut 75 is tightened. More specifically, referring to the clamping arm 70 engaged with the B mold base 30 and B mold insert 31 in FIGS. 3 and 4, the clamping leg 71 acts as a pivot member or fulcrum as the nut 75 is tightened causing the clamping leg 72 to bear firmly against the sloped surface portion 87. The clamping leg 72 provides a force directing the mold insert 31 securely against the flat surface 42 of the runner block 36 and also a force urging the mold insert surface 55 toward the mold base support surface 57. Moreover, the pivot leg 71 tends to try to slide down the sloped wall 85 pulling the clamping leg 72 also in a direction toward the mold base 30 with a further force component that draws the mold insert surface 55 and support surface 57 into secure abutting relation.

Figure 4:
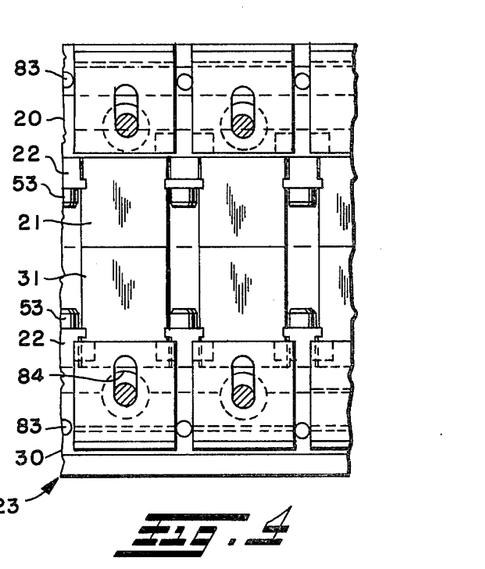
FIG. 4 is a fragmentary enlarged end elevation view of several pairs of A/B (means A and B) mold inserts and mold bases looking generally in the direction of the arrows 4—4 of FIG. 3.
Figure 5:
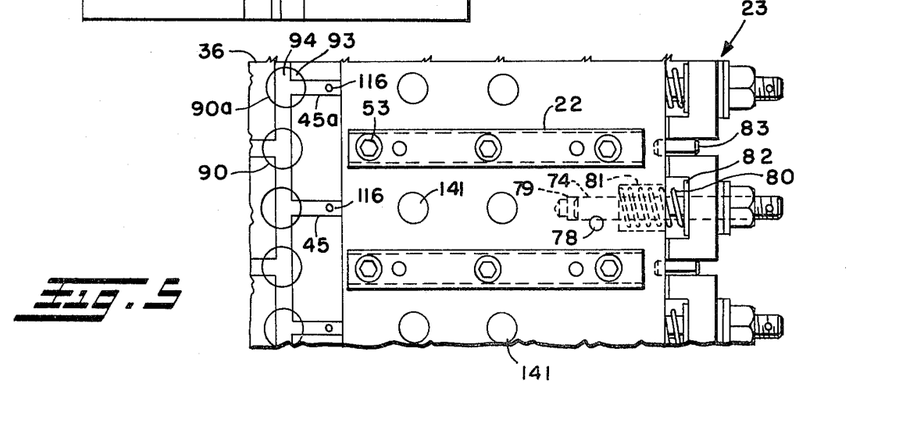
FIG. 5 is a fragmentary top view of the B mold base with the mold inserts removed looking generally in the direction of the arrows 5—5 of FIG. 3.

To insert or to remove a mold insert 21, 31 from its respective mold base 20, 30, a respective nut 75 is loosened and a respective clamping arm 70 is slid to the position shown in the upper portion of FIGS. 3 and 4 allowing unobstructed movement of the respective mold insert in a direction parallel to the rails 22 until fully removed from the rails or fully inserted into position. Ordinarily such removal or insertion must take place with the base support plate 11 moved to its withdrawn position away from the top clamp plate 12 in order to separate the self-aligning guide pins 62 from guide openings 64 of the mold inserts. Although separate clamping arms 70 are preferred, and in some instances more than one clamping arm would be used to hold a relatively wide mold insert, such as the mold inserts 21', 31', if desired a single clamping arm extending the length of the mold base along which the mold inserts would be placed or the length of plural mold inserts may be substituted for the individual clamping arms.

Briefly turning to FIG. 5, the channeled runner block 36 has a plurality of valve shut-off controls 90. An exemplary control 90 illustrated in FIG. 14 includes a cylindrical valve part 91 extending through the runner block 36 sealed by one or more O-rings 92 and captured in position by an enlarged head 93. A T-shaped channel 94 in the central control end of the part 91 provides the desired flow control ability and facilitates turning, say by a screwdriver type tool. Such controls 90 may be turned manually by means not shown to cut off flow of molding material to one or more respective individual runner channels 45 while still permitting or not permitting flow along all or part of the length of the main runner channel 43. For example, assuming an inlet feed of molding material from the lower unshown portion (relative to FIG. 5) of the main runner channel 43, if the control 90a shown at the uppermost portion of FIG. 5 were turned counterclockwise 90° from the position shown, there would be no flow to the individual runner channel 45a or beyond such control. If control 90a were turned 180° counterclockwise, such control would not shut off the main runner channel 43 but would prevent flow to the uppermost individual runner channel 45a. Moreover, if control 90a were turned 90° clockwise, flow to the associated individual runner channel 45a would be permitted from the lower portion of the main runner channel 43 but flow of molding material in the main runner channel 43 beyond such control 90a would be blocked.

Although the surfaces 63, 65 of respective mold inserts 21, 31 are shown schematically, i.e. blank, in FIGS. 6 and 7, as well as in several other figures, it is in those surfaces and beneath the same that respective mold cavity halves are defined so that when a pair of A/B mold inserts are brought together a complete well defined mold cavity 98 of prescribed configuration is formed while the remaining intact portions of surfaces 63, 65 provide at least a substantially completely fluid-tight seal to prevent leakage of molding material from the mold cavities. In FIGS. 8-11 the means accurately forming the mold cavity halves are illustrated.

Referring to FIGS. 8-11, there is a stepped groove-like cut-out 99 longitudinally along the entire surface 63 of the A mold insert 21. A mold cavity insert 100 is placed in the cut-out 99 and is held there in position by a plurality of cap screws 101, 102, and a keeper bar 103. A cavity 104 in the mold cavity insert 100 is of accurately defined configuration for the molded part to be formed by injection of molding material therein.

Ordinarily a core 105 would be inserted into the cavity 104 to complete the prescribed definition of mold cavity 98 for the particular part intended to be molded. Accordingly, in the B mold insert 31 there is a stepped slot 106 extending through the body of the mold insert 31 from the bottom surface 55 to the top surface 65. In the slot 106 is positioned a mold core insert 107, which has the protruding core 105 as part thereof. The mold core insert is fastened securely to the body of the mold insert 31 by cap screw fasteners 108. The actual positioning of the mold core insert 107 may be performed while the core 105 is inserted into the cavity 104 with the mold inserts 21, 31 in the engaged position shown in FIG 9, after which the cap screws 108 may be tightened.

Each of the mold inserts 21, 31 preferably is an entirely self-contained unit having functions in addition to the mold cavity defining function described above. For example, a molding material delivery mechanism is provided to deliver molding material from an individual runner channel 45 to the mold cavity 98 while also providing a capability of shearing the sprue and the molded part upon opening of the mold cavity, i.e. parting of the pair of mold inserts 21, 31. In particular, the A mold insert 21 has a molding material delivery passage 110 through which molding material is delivered into the mold cavity 98 defined by the cavity 104 and the core 105. Molding material is conducted to the delivery passage 110 from an individual runner channel 45 via a flow path groove 112 in the top surface 65 of the B mold insert 31.

Figure 8:
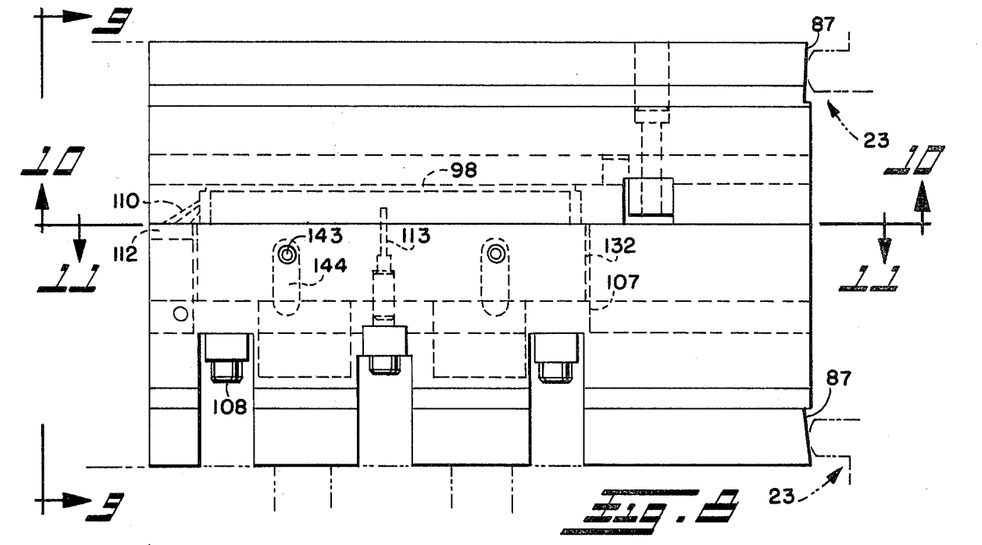
FIG. 8 is a side elevation view of a pair of A/B mold inserts with a respective mold cavity insert and mold core insert in place therein to define an accurate mold cavity.
Figure 9:
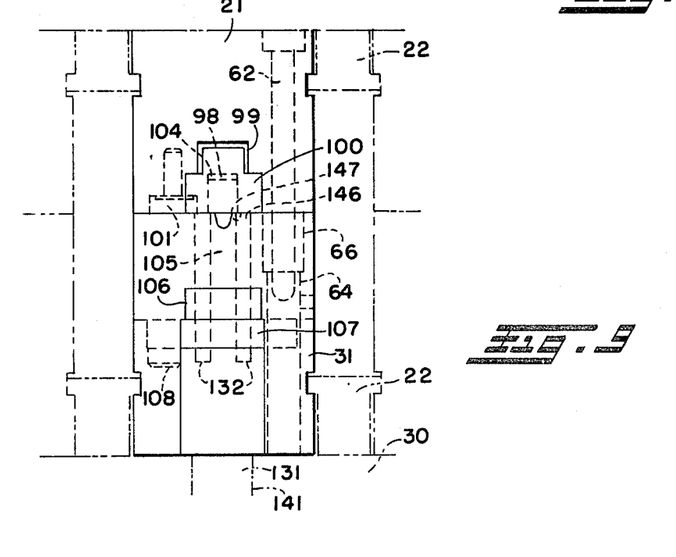
FIG. 9 is a fragmentary end elevation view of a pair of A/B mold inserts looking generally in the direction of the arrows 9—9 of FIG. 8.
Figure 10:
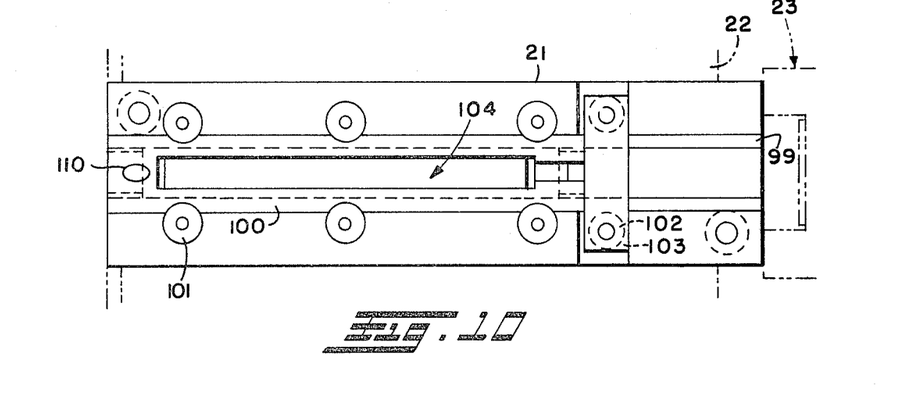
FIG. 10 is a bottom plan view of an A mold insert with a mold cavity insert therein looking generally in the direction of the arrows 10—10 of FIG. 8.
Figure 11:
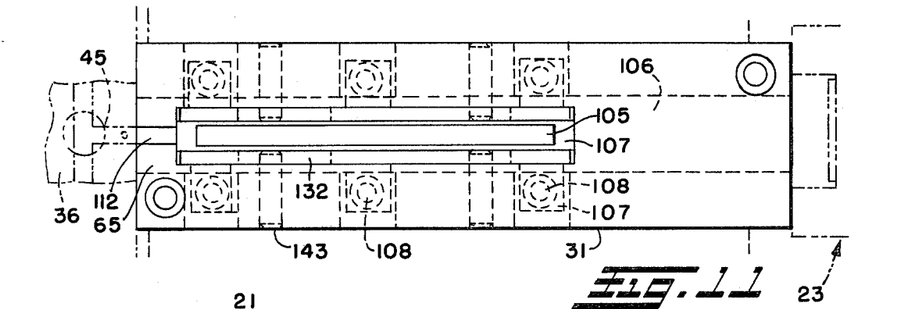
FIG. 11 is a top plan view of a B mold insert and mold core insert therein looking generally in the direction of the arrows 11—11 of FIG. 8.
Figure 12:
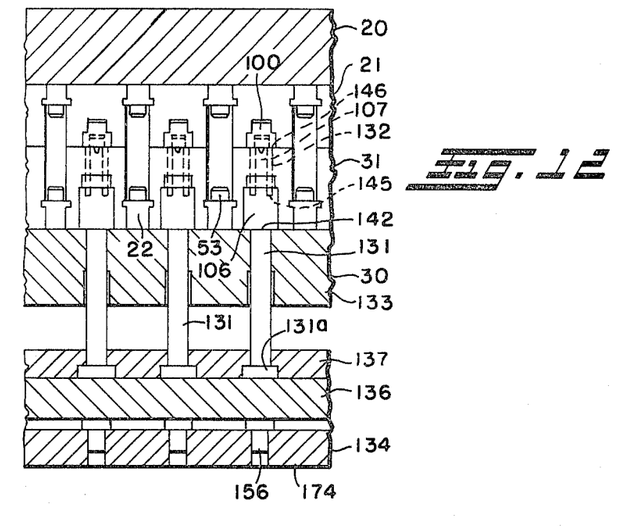
FIG. 12 is a fragmentary end elevation view of several pairs of A/B mold inserts and the associated ejector system and A/B mold bases, parts of which are shown in section.

Moreover, the molding material delivery passage 110 is tapered and sloped, as can be seen most clearly in FIGS. 8 and 10. Additionally, a sprue puller pin 113 (FIG. 14) is provided to pull the sprue with the B mold base 30 upon parting of the mold inserts, i.e. movement of the base support plate 11 away from the top clamp plate 12. Upon such parting, the sprue is sheared at an effective knife edge surface 114 from the molded part, which also preferably is drawn with the core 105 out of the cavity 104. The sloped and tapered delivery passage 110 facilitates the drawing of the sprue away from the mold insert 21 and blank runner block 35 as well as the noted shearing.

As the mold inserts are parting, it is desirable to eject the sprue from the channeled runner block 36 and to strip the molded part from the core 105. For the former, sprue ejector pins 115 eject the sprue from the main and individual runner channels 43, 45. Such sprue ejector pins 115 are seen most clearly in FIGS. 13 and 14, and the locations thereof in openings 116 in individual runner channels 45 are seen most clearly in FIGS. 5 and 11. The sprue puller pin 13 (FIG. 14) has a read portion 117 which functions both to pull the sprue away from and out of the sprue bushing 49 and to hold the sprue in the channeled runner block 36 during the mentioned parting. The sprue puller pin 113 extends through a hollow passage 118 in a modified valve control part 91'. The head 117 of the pin 113 provides a seal with a seat portion of such part 91' as shown when the pin 113 is in the illustrated returned position. However, the pin 113 also assists in ejecting the sprue with the other sprue ejector pins 115.

Referring now to FIGS. 5 and 8-14, the ejector system 130 intended to eject parts and sprue at the conclusion of a molding operation includes inter alia the sprue ejector pins 115, master part ejector pins 131, and stripper bars 132. Upward vertical movement (directions hereafter are relative to the illustrations of FIGS. 9, 12 and 13, it being appreciated that the various parts may operate, as is shown in FIG. 1, in a horizontal direction) of the sprue ejector pins 115 ejects the sprue from the runner distribution system 24; of the master part ejector pins 131 applied ejecting force to the stripper bars 132 in the B mold inserts 31; and of the stripper bars 132 themselves ejects or strips a part from a mold insert 31.

The B mold base 30 is comprised of a support plate 133 and an ejector housing 134 within the volume 135 of which is a master ejector plate 136 and an ejector return plate 137. The plates 136, 137 hold the heads 115a, 131a of the ejector pins 115, 131 in the returned position illustrated in FIG. 13, for example. A cap screw 138 secures the plates 136, 137 together. The sprue ejector pins 115 extend up through the support plate 133 and through an opening 116 in the B or channeled runner block 36. The remote end 140 of the sprue ejector pins 115 ordinarily when in the returned position is recessed below the respective individual runner channels 45, as is shown in FIG. 3.

Figure 13:
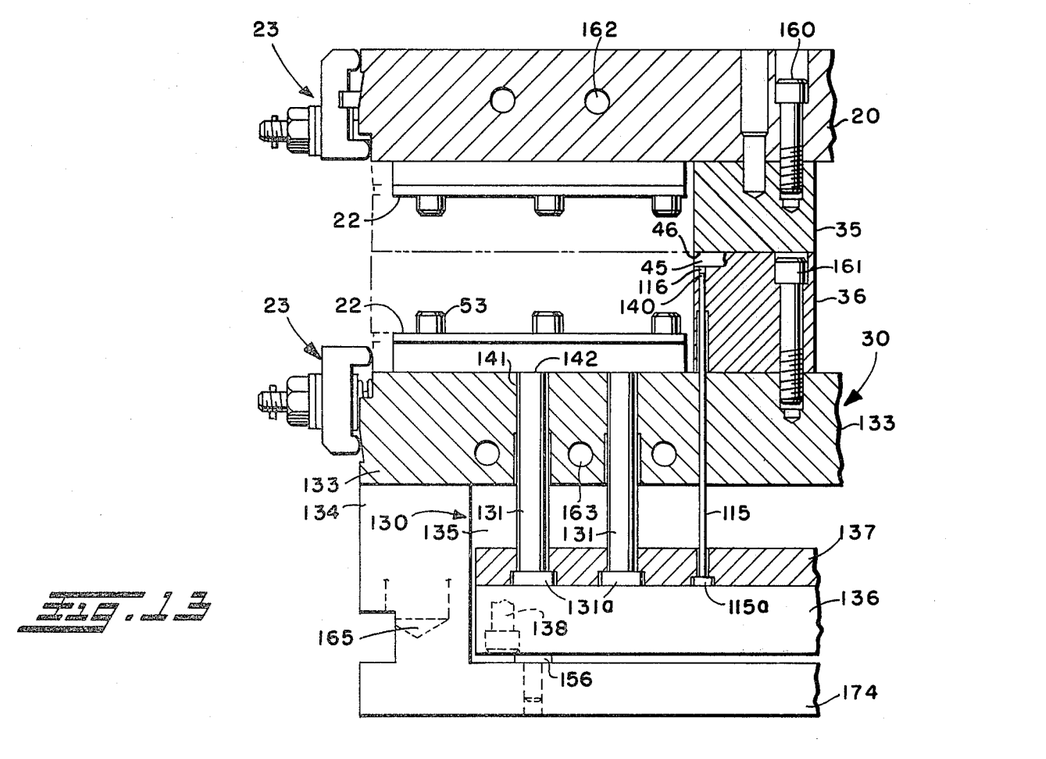
FIG. 13 is a fragmentary side elevation view, partly in section, of the A/B mold base and ejector system.

The master part ejector pins 131 extend into openings 141 in the support plate 133 and have remote ends 142, which are intended to abut stripper bars 132 to eject parts but which in the returned position are parallel to or recessed relative to the main support surface 57 of the support plate 133. Therefore, in the returned position the remote ends 142 will not interfere with the insertion or removal of B mold inserts 31.

The stripper bars 132 are formed for example, of bar stock. They are positioned in the slot 106 of the B mold insert 31 on opposite sides of the core 105, as is seen most clearly in FIGS. 9, 11 and 12. The stripper bars 132 may be moved vertically upward to strip a part off the core 105 when the mold inserts have been parted; ordinarily the core 105 is so designed to draw the molded part out of the cavity 104 upon parting of the mold inserts 21, 31. Movement of the stripper bars is limited by roll pins 143 (FIG. 8) which pass therethrough and slide in slots 144 in the body of the B mold insert 31. The stripper bars 132 have an ejecting force receiving end surface 145 to be engaged by the remote ends 142 of preferably at least two master part ejector pins 131. A stripping and return end surface 146 of the stripper bars 132 apply stripping force directly to a molded part and receive return force applied by return face 147 of the mold cavity insert 100 upon closure of a pair of mold inserts 21, 31.

The master ejector plate 136 and ejector return plate 137 preferably are common to all of the ejector pins 115, 131 thereby to operate all such pins simultaneously. A common return mechanism 150 (FIG. 14) includes the ejector return plate 137, plural return pins 151, and ejector return springs 152. The head 153 of return pin 151 is captured between the ejector return late 137 and master ejector plate 136, and the ejector return spring 152 is held in circumscribing relation about the return pin 151 by a spring return cover 154, which is fastened by screws, not shown, to the support plate 133. The spring 152 urges the ejector return plate 137 and, thus, the master ejector plate 136 and ejector pins 115, 131 to the return position shown in FIGS. 12-14. Plural stop pins 155 mounted on the A mold base 20 in alignment with respective return pins 151 assure that the return pins have fully returned the various portions of the ejector system 130 to the returned position upon closure of the mold bases 20, 30. Stop pins 156 placed in the ejector housing 134 limit the maximum downward travel of the master ejector plate 136 and other parts of the ejector system 130 to the returned position thereof.

The commonality of the ejector and return systems facilitates controlled ejection of sprue and parts in a manner that expedites separating sprue and parts and even has the capacity for facilitating separating different types of parts. The return mechanism 150 assures that the ejector system 130 is in a return position during part molding. A rod 57 or other means of convention design may be used to urge the ejector plate to move relative to the B mold base 31 during opening of the latter away from the A mold base 21; whereby the ejector plate moves the ejector pins to effect desired stripping or ejecting.

Summarizing operation of the ejector system 130, the same ordinarily is maintained in its returned position under the influence of the ejector return springs 152 and, if necessary, by the stop pins 154 and return pins 151 when the mold cavities 98 are closed. However, after a part has been molded and the mold inserts 21, 31 are parted by movement of the base support plate 11 away from the top clamping plate 12, eventually one or more pin or rod members 157 that are held in fixed position relative, for example, to the rails 13 (FIG. 1) engage the master ejector plate 136 through the ejector housing 134 and base support plate 11. As the base support plate 11 continues to be withdrawn or moved away from the top clamp plate 12, such pins 157 force the master ejector plate 136 and ejector pins 115, 131 of the ejector system 130 upward. The remote end 140 of the sprue ejector pins 115 will abut the sprue arms contained in the individual runner channels 45 thereby to eject the sprue. Subsequently, as the master ejector plate 136 continues to move upward in its travel zone provided in the volume 135 of the ejector housing 134, eventually the remote ends 142 of the master part ejector pins 131 will abut the end surfaces 145 of respective pairs of stripper bars 132 moving such stripper bars vertically to strip a part off the core 105. Preferably the master part ejector pins 131 are so distributed and dimensioned that at least two of such pins 131 will abut the ejecting force receiving end surfaces 145 of at least two stripper bars 132 of each B mold insert 31.

Preferably the ejector pins 115, 131 are arranged in a relatively fixed universal type of pattern in the B mold base 30 to enable their use for ejecting or stripping parts and sprue from different size or configured runner distribution systems 24 and B mold inserts 31. Nevertheless, one or more of such pins may be removed and/or replaced, by simply removing the ejector housing 134 and temporarily disassembling the ejector and return plates 136, 137.

Cap screws 160, 161 (FIG. 13) secure the runner blocks 35, 36 to the respective bases 20, 30. Also, in such bases are provided water flow openings 162, 163 for conducting water flow to cool or to heat the same and the mold inserts mounted thereon.

Figure 14:
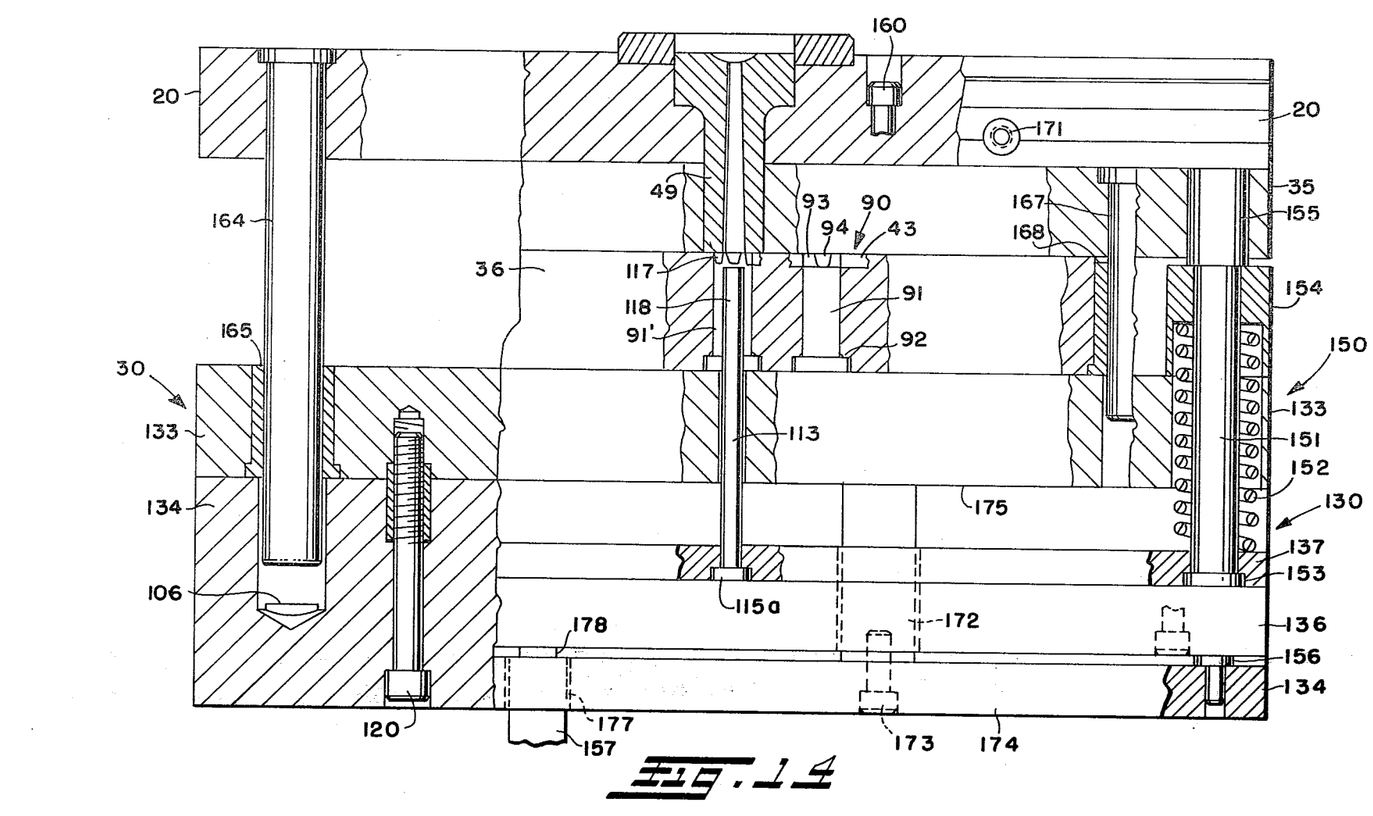
FIG. 14 is an end elevation view, partly in section, and looking at several planes of the A/B mold bases with the mold inserts removed to show the runner distribution system shut-off valves, ejector plate return pins, sprue nozzle and sprue puller pin.

Looking briefly at FIG. 14, a leader pin 164 is mounted in the A mold base 20 and extends through into the B mold base 30. A guide shoulder bushing 165 guides the leader pin 164 in the support plate 133, and a stop 166 in the ejector housing 134 limits the maximum travel of the leader pin 164. A shorter leader pin 167 passes through the blank runner block 35, shoulder bushing 168 in the channeled runner block 36 and opening 169 in the support plate 133. The leader pins 164, 167, bushings 165, 168 and openings associated therewith guide the mold bases for controlled aligned movement as they are moved toward and away from each other by the movement of the base support plate relative to the top clamp plate. A cap screw 170 secures the ejector housing 134 to the support plate 133. A fitting 171 associated with respect to a flow passage 162 is provided to couple water from an external source to such passages or to drain water therefrom.

To guide movement of the master ejector plate 136 and ejector return plate 137 one or more support pillars 172 may be secured by cap screws 173 or other means in the position shown in FIG. 14, for example, between the base 174 of the ejector housing 134 and the bottom surface 175 of the support plate 133. One or more openings 176 in the ejector housing base 174 may be provided to guide pins 157 into abutting engagement with stops 177 on the bottom of the master ejector plate 136 to move the latter for ejecting purposes as the base support plate is opened away from the top clamp plate.

Set-up of the injection molding system 10 for operation may be accomplished with facility. For example, on the base support plate 11 and top clamp plate 12 respective mold bases are installed. Thereafter pairs of mold inserts are inserted between respective pairs of rails on the mold bases. With the mold inserts relatively loosely held in place by the rails, the base supports and top clamps plates are closed to bring together into abutting relation opposed pairs of mold inserts while such mold inserts self-align. With the mold inserts thus aligned, the clamping apparatus is tightened to clamp the mold inserts in relatively fixed relation on the respective mold bases.

After the mold inserts have been so installed, the runner control valves 90 may be adjusted appropriately to direct molding material to some or all of the installed mold inserts and particularly the mold cavities 98 formed by mold insert pairs. The base support plate then is moved toward the top clamp plate to close a sealed fluid flow path for molding material injected through the sprue bushing 50, via the runner distribution system 24 into the respective mold cavities 98 to mold parts and sprue. After the molding material has solidified adequately, the base support plate is moved away from the top clamp plate opening the respective mold cavities while the sprue remains held in the channeled runner block 36, while the sprue automatically is sheared away from the molded parts, and while the molded parts are held on the respective cores 105. Continued movement of the base support plate away from the top clamp plate will effect operation of the ejector system 130 first to eject the sprue and later to eject the parts. Thereafter, upon at least partial closure of the mold cavities again, the return system effects returning of the several ejector pins in the ejector system 130. The molding process may be repeated.

STATEMENT OF INDUSTRIAL APPLICATION

With the foregoing in mind, it will be appreciated that the apparatus and method of the present invention may be used in connection with injection molding or even with other types of molding operations.

We claim:

1. An injection molding system, comprising plural mold inserts, mold base means for supporting at least one mold insert thereon, rail means for holding at least one mold insert on said mold base means, and holding means for holding said at least one mold insert to said rail means to prevent lateral movement of said mold insert relative to said mold base means and from movement out of the plane of such mold base means while permitting sliding of said mold insert along said rail means.

2. The system of claim 1, said mold base means comprising a pair of the same for mounting, respectively, on the top clamp plate and base support plate of an injection molding machine, and said rail means comprising rail means on each of said mold base means.

3. The system of claim 2, further comprising alignment means for aligning respective pairs of mold inserts when brought together upon relative closure of such top clamp plate and bottom support plate, and clamp means for clamping such thusly aligned mold inserts in relatively fixed position on such respective top clamp plate and bottom support plate.

4. The system of claim 3, said clamp means including means for operating the same to clamp and to unclamp said mold inserts when such top clamp plate and bottom support plate are relatively closed.

5. The system of claim 2, said rail means comprising plural rails, and further comprising means for holding respective pairs of rails in relatively parallel relation.

6. The system of claim 5, said means for holding comprising means for removably attaching said rails to said mold base means to permit adjustment of the space between adjacent pairs of parallel rails to accommodate therein mold inserts of different respective sizes.

7. The system of claim 1, said holding means comprising a groove in side walls of said at least one mold insert and flanges on said rail means for fitting in respective grooves to hold respective mold inserts.

8. The system of claim 7, further comprising clamp means for clamping mold inserts in position on a mold base means between respective pairs of rail means.

9. The system of claim 1, further comprising runner distribution means mounted on said mold base means for distributing molding material to respective mold inserts, and said rail means being positioned to guide respective mold inserts to fluidic coupling relation with said runner distribution means.

10. The system of claim 9, further comprising clamp means for urging said respective mold inserts into fluidic coupling engagement with said runner distribution means.

11. The system of claim 9, wherein said runner distribution means has a main runner channel and plural individual runner channels for coupling with respective mold inserts, and further comprising valve means for selectively opening and closing individual runner channels.

12. The system of claim 2, further comprising clamp means for clamping mold inserts in position on respective plate means between respective pairs of rail means.

13. The system of claim 12, said clamp means comprising a clamping member for applying to at least one mold insert a bidirectional force, including one force to push said mold insert into engagement with a stop surface on said plate means and a second force to pull said mold insert into engagement with said plate means.

14. The system of claim 1, further comprising stripper means in at least one of said mold inserts for stripping a molded part therefrom and main ejector means in said mold base means for moving said stripper means to strip such molded part.

15. The system of claim 14, said stripper means comprising stripper bars and said ejector means comprising pins having leading edges submerged to at least parallel or lower plane with respect to a main support surface of said mold base means on which said mold insert is mounted to prevent interference with positioning of said mold insert on said main support surface.

16. The system of claim 15, said ejector means comprising a plurality of the same for moving stripper means of respective mold inserts, and further comprising return means for returning all of said ejector means to a return position.

17. An injection molding system, comprising at least one pair of mold insert means engageable for injection molding a part, plural relatively movable mold base means for supporting mold insert means, runner distribution means on at least one of said mold base means for distributing molding material to mold insert means, said runner distribution means including a main runner channel, plural individual runner channel means for distributing molding material to plural respective mold insert means from said main runner channel, and valve means for controlling flow of molding material from said main runner channel to respective individual runner channel means.

18. The system of claim 17, one mold insert means of a pair thereof including a mold cavity insert means into which molding material is delivered from a respective individual runner channel means, and the other mold insert means of such pair including a mold core insert means for cooperating with said mold cavity insert means to form a mold cavity in which a part can be molded.

19. The system of claim 18, said mold core insert means including means for drawing such molded part from said mold cavity insert means upon parting of said pair of mold insert means.

20. The system of claim 19, further comprising stripper means in said mold insert means containing said mold core insert means for stripping a molded part therefrom.

21. The system of claims 17 or 20, said runner distribution means comprising a channeled runner block containing said main runner channel and individual runner channel means in one surface portion and a substantially blank runner block having a cooperative surface means for effecting a substantially fluid-tight seal with said one surface portion to prevent leaking of molding material from said main runner channel and individual runner channel means, and further comprising sprue puller means for pulling the sprue to hold the same in said channeled runner block upon parting of said plural mold base means.

22. The system of claim 21, further comprising sprue eject means for ejecting the sprue from said channeled runner block before the molded part is stripped.

23. The system of claim 17, further comprising a shearing knife edge surface means at a portion of the flow path of molding material into a mold insert means for shearing the connection between the sprue and molded part.

24. An injection molding system, comprising at least one pair of mold insert means engageable to form a mold cavity for molding a part therein, one mold insert means having molding material delivery passage means for delivering molding material into said mold cavity, the other mold insert means having a flow path means for conducting molding material to said delivery passage means, relatively movable support means for supporting said mold insert means for movement toward and away from each other to establish said mold cavity for molding and to open said mold cavity for discharging such part, and runner distribution means for distributing molding material to said mold insert means, including runner channel means for conducting molding material to said flow path means.

25. The system of claim 24, said at least one pair of mold insert means comprising a plurality of pairs of mold insert means for forming plural respective mold cavities to mold respective parts therein, said runner distribution means comprising a channeled runner block having said runner channel means in one surface portion therein and a substantially blank runner block having a cooperative surface means for effecting a substantially fluid-tight seal with said one surface portion to prevent leakage of molding material from said runner channel means, and said runner channel means comprising a main runner channel means for receiving molding material from a supply thereof and individual runner channel means in said runner channel block for delivering molding material from said main runner channel means to respective flow path means in said pairs of mold insert means.

26. The system of claim 25, further comprising means for mounting said runner blocks on said support means, and clamp means for clamping respective mold insert means in engagement with respective runner blocks to form, when said mold insert means of respective pairs are engaged with each other and said runner blocks are engaged with each other, a substantially fluid-tight flow path from said runner channel means, individual runner channel means, flow path means, and delivery passage means to respective mold cavities.

27. The system of claim 26, further comprising rail means for holding respective mold insert means on said support means.

28. The system of claim 24, further comprising knife shear surface means at the junction of said delivery passage means and mold cavity means for shearing the sprue from a molded part upon parting of said relatively movable support means to open said mold cavity.

29. The system of claim 28, said support means comprising plural mold bases attachable to respective top clamp plate means and bottom support plate means of an injection molding machine, and further comprising sprue puller means for pulling the sprue to hold the same in said channeled runner block upon parting of said top clamp plate means and said bottom support plate means, and sprue eject means for ejecting the sprue from said channeled runner block.

30. The system of claim 29, further comprising eject means for ejecting a part from a mold cavity, and wherein said sprue eject means comprises means for ejecting the sprue before the molded part is ejected.

31. A mold insert for an injection molding system, comprising a mold body, a mold cavity defining insert means in said body for defining at least part of a mold cavity for molding a part therein, and self-contained stripper means in said mold body and movable with respect to said mold cavity for stripping a molded part therefrom.

32. The insert of claim 31, said mold cavity defining insert means comprising a mold core insert for cooperating with a mold cavity insert to define a prescribed mold cavity.

33. The insert of claim 31, said stripper means comprising stripper bars.

34. The insert of claim 31, further comprising opening means in said mold body for receiving an ejecting device to move said stripper means to strip a molded part from said mold cavity.

35. The insert of claim 31, further comprising a further mold body having a further mold cavity defining insert means therein for defining part of said mold cavity, said further mold cavity defining insert means comprising a mold cavity insert, and said mold cavity defining insert means comprising a mold core insert.

36. The insert of claims 31 or 35, further comprising alignment means for aligning said mold body with a further mold body accurately to form therewith a prescribed mold cavity.

37. The insert of claim 36, said alignment means comprising plural pins extending outwardly from one mold body and plural receptacles in the other mold body to receive respective pins.

38. The insert of claim 31, further comprising groove means in at least one wall of said mold body for receiving a retaining device to hold said mold body in an injection molding system.

39. The insert of claim 31, said mold body including molding material delivery passage means for delivering molding material into said mold cavity.

40. The insert of claim 35, said further mold body having molding material delivery passage means for delivering molding material into said mold cavity and said mold body having a flow path means for conducting molding material to said delivery passage means.

41. The insert of claim 34, said mold body having a bottom surface engageable with a surface of a plate-like support, said stripper means being substantially completely contained within said mold body to preclude direct engagement by said stripper means with such plate-like support.

* * * * *